Jan. 2, 1923.
C. H. BLISS.
STRIPPING AND CONVEYING MECHANISM FOR CONTINUOUS BRICK AND TILE MACHINES.
FILED FEB. 3, 1921.
1,440,716.
3 SHEETS—SHEET 1.
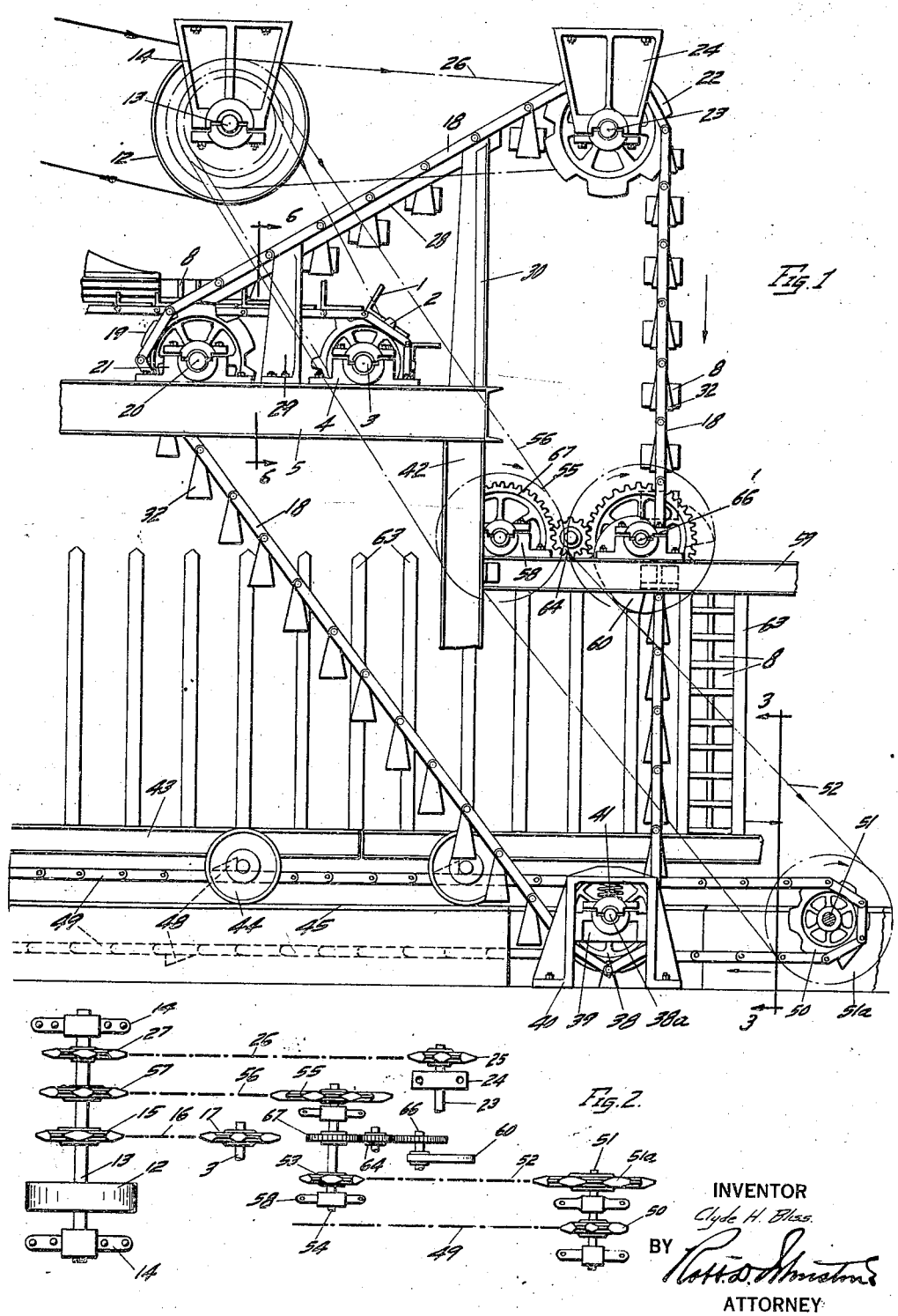

Jan. 2, 1923.
C. H. BLISS.
STRIPPING AND CONVEYING MECHANISM FOR CONTINUOUS BRICK AND TILE MACHINES.
FILED FEB. 3, 1921.
1,440,716.
3 SHEETS—SHEET 2.
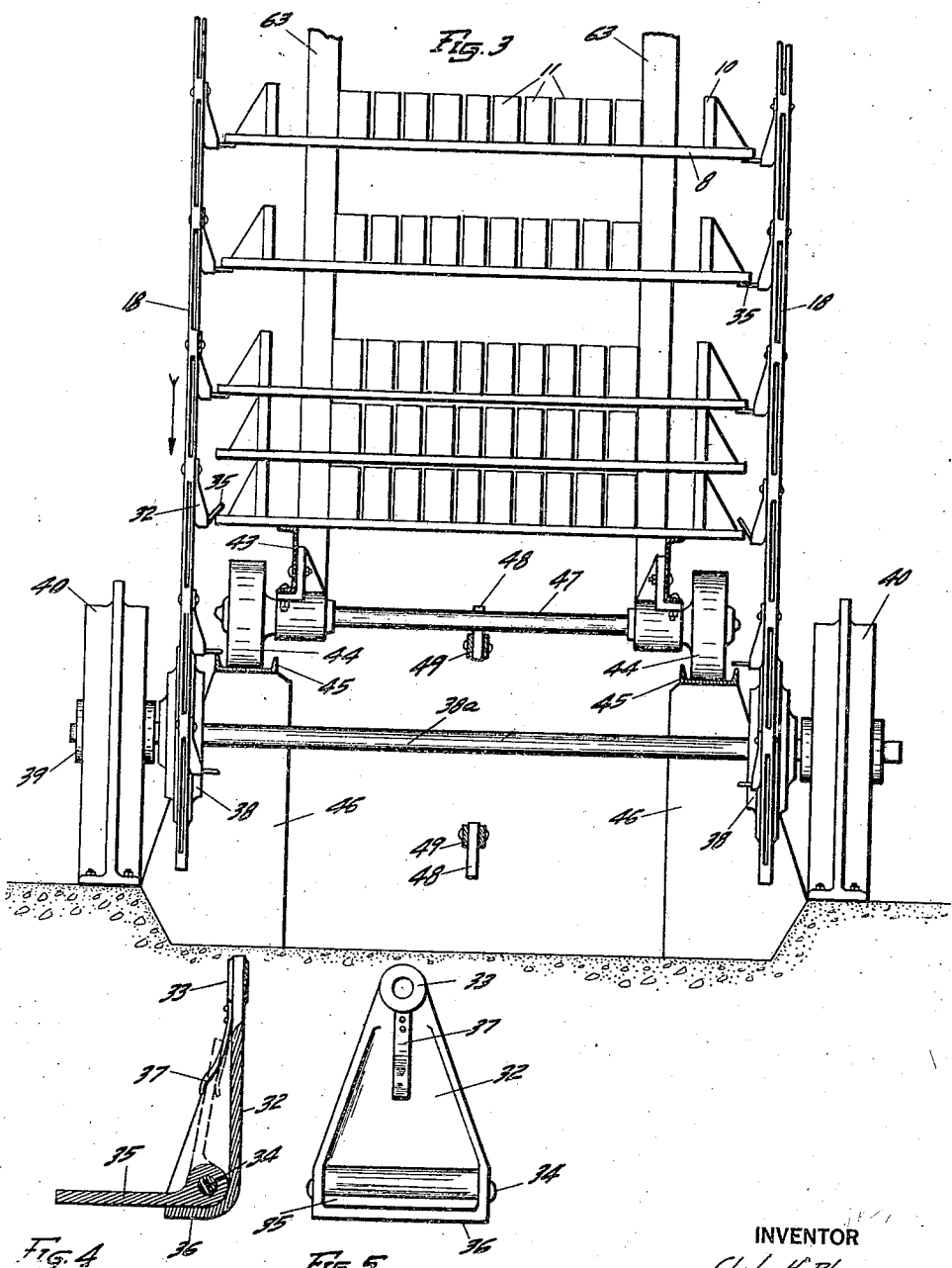
INVENTOR
Clyde H. Bliss,
BY
ATTORNEY Jan. 2, 1923.
C. H. BLISS.
STRIPPING AND CONVEYING MECHANISM FOR CONTINUOUS BRICK AND TILE MACHINES.
FILED FEB. 3, 1921.
1,440,716.
3 SHEETS—SHEET 3.
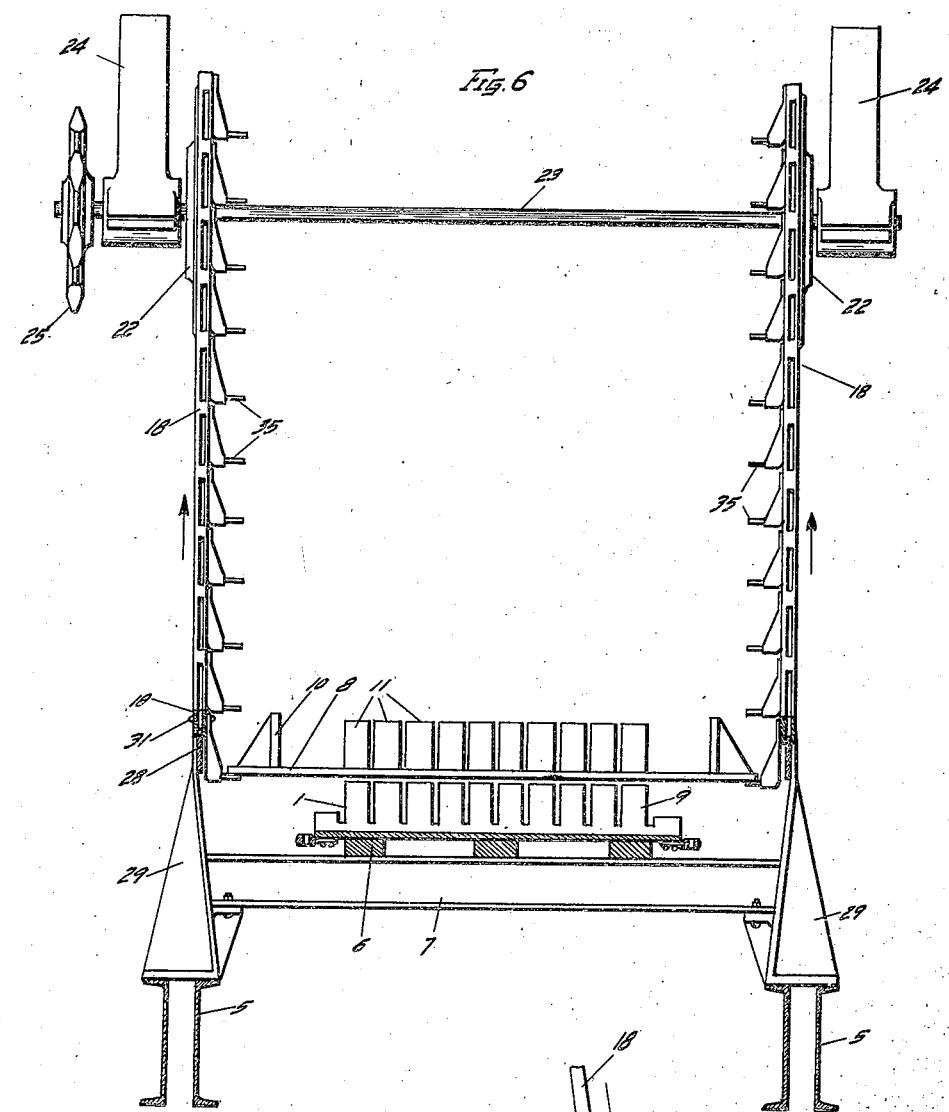
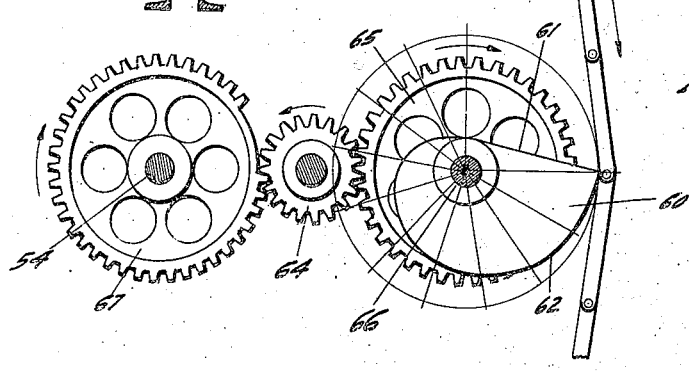
INVENTOR
Clyde H. Bliss.
BY
ATTORNEY Patented Jan. 2, 1923.

1,440,716

UNITED STATES PATENT OFFICE.

CLYDE H. BLISS, OF BIRMINGHAM, ALABAMA.

STRIPPING AND CONVEYING MECHANISM FOR CONTINUOUS BRICK AND TILE MACHINES.

Application filed February 3, 1921. Serial No. 442,273.

*To all whom it may concern:*

Be it known that I, CLYDE H. BLISS, a citizen of the United States of America, residing at Birmingham, in the county of Jefferson and State of Alabama, have invented certain new and useful Improvements in Stripping and Conveying Mechanism for Continuous Brick and Tile Machines, of which the following is a specification.

My invention has relation to mechanism for stripping and conveying the molded product from continuous brick and tile machines, and its chief object is to accomplish these purposes by a continuous mechanical means which will eliminate labor and reduce cost in connection with this phase of the manufacture of machine made brick and tile.

In a companion application Serial No. 440,286 filed the 27th day of January, 1921, I have described and claimed certain improvements in a continuous machine for the manufacture of brick from concrete and cementitious mixtures, and my present invention is especially designed to co-operate with that machine, but it is to be understood that my invention may be varied in its design and construction to apply its novel features to the stripping and transferring of the molded product from other continuous machines for the manufacture of brick, tile or like molded articles. In said application I show endless flights carrying pallets upon which the molded brick are formed, which pallets are adapted to be engaged and stripped from the flights by a transfer mechanism so timed and disposed as to trowel the ends of the brick by stripping them in a line parallel with the walls of the molds on the moving flights.

The purpose of my present invention is to deal with the pallets as handled by such transfer mechanism and my object is to cause the transfer mechanism to automatically stack the pallets on a suitable truck or moving conveyor, preferably having racks for the reception of stacks of pallets and which is movable to deliver the molded product to the apparatus in which it is to be dried or otherwise treated to finish it.

One distinctive feature of my invention is the provision of a continuously moving receiver for the pallets with co-ordinated agencies acting on the receiver and the transfer mechanism to effect the stacking of the pallets on the receiver.

A further object is to co-ordinate the drives for the endless flights of the molding machine, the transfer mechanism, the transfer adjusting mechanism, and the advancing of the pallet receiver, all being so co-ordinated that the pallets are successively stripped from the flights and deposited in stacks upon the receiver by or from which they are transported to the finishing plant or drying kiln.

A further distinctive feature of my invention is the provision of novel means on the transfer by which the pallet carriers will yieldingly pass the pallets already in a stack.

A further distinctive feature is the adapting of the endless transfer conveyor to have its vertical flight displaced by a cam with a movement so co-ordinated with that of the pallet receiver that the stacking of pallets is possible. The drive for this adjusting cam is adapted to permit a gradual displacement of the transfer conveyor in one direction and its sudden return to initial position after its completes a stack of pallets.

My invention also comprises the novel details of construction and arrangements of parts, which in their preferred embodiment only are illustrated in the accompanying drawings, and in which:—

Fig. 1 is a side elevation of the discharge end of a continuous molding machine co-operating with my improved transfer mechanism for the pallets, and truck conveyor to receive the stacks of pallets.

Fig. 2 is a detail plan view diagrammatically illustrating the co-ordinated drives for the different moving elements.

Fig. 3 is a sectional view taken on the line 3—3 of Fig. 1, and showing the pallet receiving truck and the transfer mechanism in front elevation.

Figs. 4 and 5 are views in vertical section and front elevation of the yielding pallet carriers of the transfer mechanism.

Fig. 6 is a vertical sectional view taken on the line 6—6 of Fig. 1, and illustrates the stripping of the pallets from the molding machine flights.

Fig. 7 is a detail view of the intermittent drive for the transfer displacing cam.

Similar reference numerals refer to similar parts throughout the drawings.

According to the illustrated embodiment of my invention, I show a brick molding machine in part, comprising traveling flights 1 driven by sprocket wheels 2 mounted fast on a drive shaft 3 turning in bearings 4 at one end of the supporting frame 5 for the machine. The flights 1 slide on bars 6 carried by the cross members 7 of the frame and they support pallets 8 which project beyond the ends of the flights and form the bottoms of the molds, the walls of which are formed by the slotted walls 9 of the flights. The pallets at each end carry upright spacer boards 10 which project above the top faces of the molded articles 11, such as brick, blocks, tiles or the like. The pallet bearing flights 1 are caused to travel continuously to the right (Fig. 1). A pulley 12, driven from any source of power, is fast on a main overhead drive shaft 13 having suitable bearings 14 and a sprocket 15 which, by means of a chain 16, drives a sprocket 17 fast on the shaft 3.

The transfer mechanism which strips the pallets from the flights comprises a pair of endless chains formed by links 18 which pass around idler sprockets 19 fast on the shaft 20 which is mounted in bearings 21 on the main frame to the left of the bearings 4. The chains 18, after passing the idler sprockets 19, travel upwardly to the right towards the overhead driving sprockets 22 which are fast on a shaft 23 that are journaled in bearings 24. This shaft 23 is provided with a sprocket 25 driven by a chain 26 from a sprocket 27 on the main driving shaft 13. To avoid sag in the transfer chains in their flight from the sprockets 19 to 22 I provide for each chain a vertically inclined guide 28 mounted by suitable supporting brackets 29 and 30 on the main frame 5. These guides 28 extend from the sprockets 19 substantially to the sprockets 22. To the connecting pins 31 (Fig. 6) for the chain links 18 I connect on the inner side of the chain a swinging hanger comprising a bracket member 32 which tapers upwardly to its journal boss 33 and which is reinforced by side and bottom webs forming a shallow inwardly facing pocket across which is passed a rivet pin 34 which pivotally mounts in the pocket a swinging plate 35, which in normal operating position, as shown in Fig. 4, rests in horizontal position on the bottom flange 36 of its bracket. The plate, however, is free to swing upwardly to dotted position (Fig. 4), when it will engage a flat spring 37 attached to the upper end of the bracket and adapted to press the plate outwardly so that it will fall down by gravity to its horizontal operating position. These lifting plates on a pair of oppositely disposed brackets are so adapted to move into position under and lift the outer ends of a pallet from the flights, as seen in Fig. 6, and the disposition of the guides 28 and the co-related movement of the transfer 18 and the flights 1 are such as to cause each pallet to be stripped with a parallel line of movement between the slotted flight walls 9 forming the ends of the molds above such pallet and by this means the ends of the finished product are troweled. The transfer mechanism as thus described, lifts the flights upwardly until the chains 18 pass over the sprocket 22 and therefrom the chains pass downwardly to the idler sprockets 38 journaled in sliding bearings 39 which are vertically movable in guides 40. The bearings are yieldingly pressed downwardly by coil springs 41 which will yield sufficiently to permit the displacement of this vertical flight of the chains by the means and for the purposes later described. From the idlers 38 the chains 18 return to the sprockets 19.

The main frame 5 is preferably supported in elevated position by a frame work 42 above a conveyor which is adapted to receive the pallets from the transfer mechanism. This conveyor, as shown, is formed by a series of trucks 43 mounted to travel on wheels 44 along tracks 45. The trucks are preferably made up of an open rectangular channel iron frame which projects but slightly above the top level of the wheels and the tracks 45 are preferably formed by upturned channels mounted on any suitable supports 46. The wheels are mounted on axles 47 which are adapted to be engaged by teeth 48 on an endless feeder chain 49 which passes centrally and lengthwise of the track and which is driven by means of a sprocket wheel 50 at one end, there being a similar idler sprocket (not shown) at the other end of the chain. The sprocket 50 is mounted on a shaft 51 which is driven by means of a chain 52 from a sprocket wheel 53 on a countershaft 54, which in turn is driven by a sprocket wheel 55 through a chain 56 leading from a sprocket wheel 57 on the main shaft 13. This countershaft 54 is mounted in suitable bearings 58 disposed upon a forward extension 59 of the metal frame work, which supports the mechanism for causing the delivery end of the transfer mechanism to move intermittently with the trucks.

This transfer moving mechanism comprises a pair of similarly disposed cams 60, each having a radial face 61 connecting the inner and outer ends of a curved working face 62 which follows a curve, similar to a spiral, plotted so as to push the chains 18 to the right, and cause the descending flight of the chains to have a displacement equal to and timed with the movement of the conveyor 43 during the time that the curved working faces of the cams are controlling the chains. In other words, assuming that when the curve faces at the base of the straight face 61 engage the chains the cams are in initial position, as shown in Fig. 1, and that in such position the vertically descending flight of the chains 18 is in central position between a pair of rack members 63 forming a receptacle for a stack of pallets, the cams will turn with a movement co-ordinated with the rotation of the truck moving sprockets 50 and will displace the chains to the right with a movement equal to the movement of the receiving truck. When the cams reach the extreme of their operating position, shown in Fig. 7, the transfer chains will have deposited the predetermined number of pallets to form a stack on the truck and it is then necessary to permit the transfer chains to return to initial position by shifting backward relatively to the continuously moving truck sufficiently to permit the flights to enter the next succeeding rack. It is desirable to obtain this shift with a quick movement and this I accomplish by providing a lost-motion drive for the cams, shown in Fig. 7, which consists of an idler pinion 64 meshing a complete driven gear 65, fast on the cam shaft 66, and a fragmental driving gear 67 fast on the countershaft 54. The teeth are removed from the gear 67 through an arc which represents the idle movement of the cam from maximum displacement position, shown in Fig. 7, to initial or zero displacement position, shown in Fig. 1, and the gears are so arranged that the cam gear 65 is released at the moment of the cam assuming the maximum displacement position, as in Fig. 7. When the cams are thus released, bearing in mind that the chains are in engagement with the cams and that their weight and movement tend to shift the cams towards their zero displacement position, the effect actually obtained is that the cams will shift almost instantly from their positions in Fig. 7 to the positions in Fig. 1, thus bringing the transfer chains into line with the next succeeding rack pocket. Assuming that it is desired to deposit ten pallets to a rack pocket, the gear teeth should be moved through an arc of 36°, representing one-tenth of the cycle, during which one-tenth of the cycle the chains shift to bring the first pallet of the new series into position above its respective pocket and thereafter the chain moves forward equally with the pocket while lowering the pallet down through the pocket. In this manner this pallet and the succeeding nine pallets are both advanced and lowered with the movement of the core so that at the completion of the cycle the ten are deposited in the rack pocket and the operation is repeated continuously.

In order that the pallet carriers may, as they move downwardly, pass the pallets already in a stack, the pallet supporting hinge plates 35 are hinged so that they will swing upwardly, as shown in Fig. 3, and they will thus pass the lower pallet ends in a stack without positive engagement therewith, and obviously the supporting plates will release the pallets which they respectively support when the latter engage the pallets in the stack.

The several driving sprockets on the shaft 13 and the driven sprocket on the shafts 3, 23, 51 and 54 are all designed and arranged to produce a co-ordinated continuous drive and adjustment of parts as described so that the transfer successively strips the pallets from the molding machine flights, deposits them in stacks between the racks 53 of the moving conveyor trucks 43 and returns to the molding machine flights, while the rack trucks are moved continuously preferably into a drying kiln so that the green molded product can be finished ready for shipment without requiring handling.

Having thus described my invention, what I claim as new and desire to secure by Letters Patent, is:—

1. The combination with a continuous molding machine, of a continuous transfer to strip pallets from a molding machine, a moving receiver on which the pallets are deposited by said transfer, and means to move the transfer mechanism in correspondence with the receiver to deposit the pallets in stacks thereon.

2. The combination with a continuous molding machine, of an endless transfer adapted to strip pallets from the molding machine, a moving receiver upon which the pallets are deposited by said transfer, and means to move the delivery portion of the transfer intermittently in synchronism with the receiver to stack the pallets thereon.

3. The combination with a continuous molding machine, of a continuous transfer adapted to strip pallets from the molding machine, a continuously moving receiver upon which the pallets are deposited by said transfer, means to advance intermittently the delivery end of the transfer in synchronism with the receiver to deposit thereon the pallets in stacks, and automatic means to retract the delivery end of the conveyor as each stack is completed to start a new stack.

4. The combination with a continuous molding machine, of an endless transfer for stripping pallets from the molding machine, a continuously moving receiver onto which the transfer mechanism is adapted to deposit the pallets, means to move intermittently the delivery end of the transfer in synchronism with the carrier to deposit a predetermined number of pallets in a stack, means to retract the transfer mechanism back to position to start a new stack, and a common co-ordinated drive for all said moving parts.

5. The combination with an endless transfer mechanism carrying articles adapted to be stacked, of a moving receiver for said articles, and a continuously moving cam designed and synchronized with the carrier to move intermittently the transfer mechanism forward equally with the carrier and then back to retract it to initial position before starting again its forward movement with the carrier.

6. The combination with endless transfer chains having means for carrying articles adapted to be stacked, of a moving receiver for the articles, and cam means designed and driven to push the delivery end of the transfer chains to displace them at a uniform rate of speed with the carrier.

7. The combination with endless transfer carrying articles adapted to be stacked, of a moving receiver for the articles, and means designed and driven to push the delivery end of the transfer at a uniform rate of speed with the carrier, said means comprising a cam having a substantially radial face joining the base and outer edge of a substantially spiral shaped curved working face.

8. In combination, a transfer mechanism comprising a pair of spaced endless chains having means for carrying articles adapted to be stacked, a continuously moving receiver for the articles interposed between the chains, a pair of cams adapted to engage and push the chains forward at a uniform rate with the carrier during the time necessary to complete a stack of articles, and a lost-motion drive for said cams being adapted to permit the chains to shift automatically back to position to start laying a new stack.

9. The combination with a continuous molding machine, of pallet stripping chains co-operating with the molding machine, pallet receiving trucks, means to move the latter at a predetermined speed and in co-ordination with the endless movement of the transfer chains, and means to move the pallet delivery portion of the transfer chains back and forth in co-ordination with the trucks to deposit pallets on the truck movements at predetermined intervals.

10. In combination, a continuous molding machine, endless pallet stripping chains co-operating with said machine, pallet receivers, and mechanism co-ordinated with the endless movement of said pallet stripping chains to feed said receivers between descending flights of said chains to cause the deposit of the pallets thereon at predetermined intervals.

11. The combination with an endless molding machine for forming molded articles on pallets, of an endless transfer means having its movement co-ordinated with the machine and adapted to engage and strip the pallets therefrom, inclined guides for the transfer during the stripping operation disposed to strip the pallets with a motion parallel with the mold walls, and a pallet receiving conveyor having its movement co-ordinated with the transfer mechanism and the molding machine to receive the pallets at predetermined intervals from said transfer.

12. The combination with an endless molding machine for forming molded articles on pallets, of an endless transfer means having its movement co-ordinated with the machine and adapted to engage and strip the pallets therefrom, inclined guides for the transfer during the stripping operation disposed to strip the pallets with a motion parallel with the mold walls, a pallet receiving conveyor having its movement co-ordinated with the transfer mechanism and the molding machine to receive the pallets at predetermined intervals, and means to move the discharging portion of the transfer mechanism back and forth in line with the movement of the pallet receiving conveyor and so co-ordinated therewith as to deposit the pallets in stacks thereon.

13. An endless pallet transfer comprising an endless carrier, upper and lower sprockets about which a vertical descending flight of the carrier passes, cam means disposed to act on the carrier between said sprockets to displace it, a yielding support for one of said sprockets to compensate for the displacement of the carrier, and a moving receiver on which said carrier is adapted to deposit articles.

14. In combination, a continuous molding machine carrying removable pallets which are adapted to be stacked with the molded articles thereon, an endless conveyor chain having triangularly arranged sprockets disposed to pass the upward inclined flight of the transfer by the delivery end of the molding machine to strip the pallets therefrom, cam means engaging the downwardly moving vertical flight of the transfer to displace it, a moving conveyor adapted to receive the pallets from the transfer and having its movement timed with the displacement of the conveyor and the movement of the molding machine and conveyor, and a yielding support for a transfer sprocket to compensate said displacement, substantially as described.

15. The combination with an endless transfer chain and driving and guide sprockets therefor, a yielding support for one of said sprockets, an actuating cam to displace the chains adjacent to said sprockets, and a continuous moving article receiver co-operating with said transfer chain.

16. The combination with endless transfer chains and driving and guide sprockets therefor, a yielding support for part of said sprockets, actuating cams to displace the chains adjacent to said sprockets, a continuous moving article receiver co-operating with said transfer chains, said cams being shaped to displace the chain so as to deposit a predetermined number of pallets in one stack on said moving receiver, and a lost-motion drive for said cam.

17. The combination with an endless transfer chain and driving and guide sprockets therefor, a yielding support for one of said sprockets, an actuating cam to displace the chains adjacent to said sprockets, a continuous moving article receiver co-operating with said transfer chain, said cam being shaped to displace the chain so as to deposit a predetermined number of pallets in one stack on said moving receiver, and a lost-motion drive for said cam, said lost-motion being adapted to come into play at the completion of a stack to release the cam and permit the chain and cam to snap automatically to initial position.

18. The combination with an endless transfer chain, of a moving receiver on which said chain is adapted to deposit articles in stacks, a cam to push the chain forward with the receiver while it is depositing a predetermined number of articles in a stack, and means timed with the movement of the receiver to rotate said cam, said means comprising a fragmental gear adapted to release the cam after it has accomplished a maximum displacement of the chain, the cam being adapted, responsive to the drag and weight of the chain, to snap forward to complete its cycle and resume operative relation with its fragmental gear.

19. In combination, an endless carrier for articles adapted to be stacked, a moving receiver for the articles, and means to intermittently displace the carrier to cause the articles to be stacked on said carrier, said displacing means comprising a cam, a complete gear rigid with the cam, and a fragmental driving gear for the cam gear having sufficient teeth stripped therefrom to permit the cam to shift automatically from its position of maximum carrier displacement to a minimum carrier displacement.

In testimony whereof I affix my signature.

CLYDE H. BLISS.

Witness:
NOMIE WELSH.